US012707209B2

(12) United States Patent
Sackenreuter et al.

(10) Patent No.: US 12,707,209 B2
(45) Date of Patent: Aug. 11, 2026

(54) HEARING DEVICE AND METHOD FOR OPERATING THE HEARING DEVICE

(71) Applicant: Sivantos Pte. Ltd., Singapore (SG)

(72) Inventors: Benjamin Sackenreuter, Erlangen (DE); Jens Plinzler, Erlangen (DE); Johannes Brendel, Erlangen (DE)

( * ) Notice: Subject to any disclaimer, the term of this patent is extended or adjusted under 35 U.S.C. 154(b) by 117 days.

(21) Appl. No.: 18/799,053

(22) Filed: Aug. 9, 2024

(65) Prior Publication Data

US 2024/0406643 A1 Dec. 5, 2024

Related U.S. Application Data

(63) Continuation of application No. PCT/EP2023/076638, filed on Sep. 27, 2023.

(30) Foreign Application Priority Data

Sep. 30, 2022 (DE) ..................... 10 2022 210 421.8

(51) Int. Cl.
*H04R 25/00* (2006.01)

(52) U.S. Cl.
CPC ......... *H04R 25/552* (2013.01); *H04R 25/554* (2013.01)

(58) Field of Classification Search
CPC ............................ H04R 25/552; H04R 25/554
See application file for complete search history.

(56) References Cited

U.S. PATENT DOCUMENTS

| | | | | |
|---|---|---|---|---|
| 9,325,548 B2 | 4/2016 | Haase et al. | | |
| 11,689,864 B2 | 6/2023 | Brendel et al. | | |
| 2017/0098966 A1* | 4/2017 | Walley | H02M 7/219 |
| 2018/0123355 A1* | 5/2018 | Olson | H04R 25/30 |
| 2019/0174239 A1* | 6/2019 | Niklaus | H04R 25/558 |
| 2024/0220748 A1* | 7/2024 | Li | G06K 7/10366 |

(Continued)

FOREIGN PATENT DOCUMENTS

| | | |
|---|---|---|
| DE | 102006035011 A1 | 1/2008 |
| DE | 102014101502 A1 | 8/2015 |
| DE | 102021200642 B3 | 3/2022 |

(Continued)

OTHER PUBLICATIONS

Finkenzeller, Klaus: Basic functioning. In: RFID Handbook : Basics and practical applications of transponders, contactless smart cards and NFC. 7., updated and expanded edition. München: Carl Hanser, 2015. Impressum + List of contents + S. 33-76.—ISBN 978-3-446-43943-6—3th English Edition.

*Primary Examiner* — Olisa Anwah

(74) *Attorney, Agent, or Firm* — Laurence A. Greenberg; Werner H. Stemer; Ralph E. Locher

(57) ABSTRACT

A hearing device has a control unit and a communication frontend. The communication frontend includes a resonant circuit and a transceiver for communication using electromagnetic induction. The transceiver can be switched between a first communication channel at a first frequency and a second communication channel at a second frequency. The control unit switches the transceiver between the first and second communication channels for a selective communication on one of the two communication channels. There is also disclosed a corresponding method for operating such a hearing device.

14 Claims, 2 Drawing Sheets

(56) References Cited

U.S. PATENT DOCUMENTS

2025/0220331 A1 * 7/2025 Kim .................... H04R 1/1025

FOREIGN PATENT DOCUMENTS

| | | | |
|---|---|---|---|
| EP | 2403273 | A1 | 1/2012 |
| EP | 3493556 | A1 | 6/2019 |
| WO | 2014086392 | A1 | 6/2014 |
| WO | 2015095469 | A1 | 6/2015 |

* cited by examiner

HEARING DEVICE AND METHOD FOR OPERATING THE HEARING DEVICE

CROSS-REFERENCE TO RELATED APPLICATION

This application is a continuation, under 35 U.S.C. § 120, of copending International Patent Application PCT/EP2023/076638, filed Sep. 27, 2023, which designated the United States; this application also claims the priority, under 35 U.S.C. § 119, of German Patent Application DE 10 2022 210 421.8, filed Sep. 30, 2022; the prior applications are herewith incorporated by reference in their entirety.

FIELD AND BACKGROUND OF THE INVENTION

The invention relates to a hearing device and to a method for operating the hearing device.

A hearing device such as a hearing aid is used for treating a hearing-impaired user and for compensating for a hearing loss of the user. For this purpose, the hearing device usually comprises a microphone, a signal processing system and an earpiece. The microphone produces an input signal, which is fed to the signal processing system. The signal processing system modifies the input signal and thereby produces an output signal. To compensate for a hearing loss, the input signal is amplified by a frequency-dependent amplification factor, for example in accordance with an audiogram of the user. The output signal is finally output to the user by means of the earpiece. In this way, sound signals from the environment are output to the user in an appropriately modified manner. The input signal and the output signal are each electrical signals. In contrast, the sound signals from the environment and the sound signals that are output by the earpiece are acoustic signals.

A hearing device is furthermore a mobile device, that is to say it is usually worn by the user over a relatively long time and has only small dimensions; in the case of a hearing device, the dimensions are at most a few centimeters. As a mobile device, the hearing device generally benefits from communication with other devices, for example a smartphone, tablet, television or computer. Communication within the hearing device itself, specifically between two individual devices of a binaural hearing device, is also advantageous. Communication is able to be implemented in a variety of ways; two particularly advantageous technologies for communication are on the one hand generally NFMI (near-field magnetic induction), for example RFID (radio-frequency identification), and on the other hand specifically NFC (near-field communication). Particularly communication by means of NFC is defined by a corresponding standard.

In the present case, the intention is to integrate multiple different options for communication into one hearing device. The combination of multiple appropriate technologies for communication in one single device is difficult insofar as each of these technologies requires corresponding components, which in turn require a corresponding installation space, whether it be an analog electrical component or a function that is integrated digitally into a digital chip. Specifically in the case of hearing devices, the available installation space is usually greatly restricted both for analog components and digital functions, typically to a greater extent than in the case of smartphones or computers. This is due to the smaller dimensions of a hearing device, which is usually worn in, on or behind the ear and is also usually intended to be inconspicuous. In addition, additional components usually also result in additional costs.

SUMMARY OF THE INVENTION

Against this background, it is the object of the invention to integrate multiple different options for communication into one hearing device in the most installation-space-saving and cost-effective manner possible. To this end, the intention is to specify a correspondingly improved hearing device and a suitable method for operating same.

With the above and other objects in view there is provided, in accordance with the invention, a hearing device, comprising:

- a control unit;
- a communication frontend having a resonant circuit and a transceiver for communication by way of electromagnetic induction;
- said transceiver being configured to be switched over between a first communication channel at a first frequency and a second communication channel at a second frequency; and
- said control unit being configured to switch over said transceiver between said first and second communication channels for selective communication on one of said first or second communication channels.

In other words, the objects of the invention are achieved by way of the device and a corresponding method, as claimed. Advantageous configurations, developments and variants will be described in the following and they also define the subject matter of the dependent claims. Any of the following comments in relation to the hearing device equally apply to the method and vice versa. Where steps of the method are specified in the following text, preferred configurations of the hearing device arise by virtue of its control unit or control circuit that is configured to carry out one or more of those steps.

The hearing device comprises a communication frontend ("frontend" for short). The communication frontend comprises a resonant circuit and a transceiver for communication by means of electromagnetic induction. Communication is understood to mean, in particular, transmission and/or reception of signals containing data, a data exchange for short. Such signals transmitted and/or received by the hearing device (or an individual device) are electromagnetic signals.

The resonant circuit is connected to the transceiver and is used to transmit and receive corresponding signals within the context of a communication. The resonant circuit acts here as an antenna. To this end, the resonant circuit is suitably an oscillating circuit, having an inductance and a capacitance, which define a resonant frequency of the resonant circuit. In the case of communication by means of electromagnetic induction, the inductance is then used as an antenna. In particular, the resonant frequency is a carrier frequency of the signals in the communication. In particular, the resonant circuit is not part of the transceiver but is formed separately therefrom.

In particular, the transceiver comprises a transmitter and a receiver. The transceiver is used to convert a digital signal, which is produced by the hearing device and contains data that are to be transmitted, into a transmission signal, which is then output by the resonant circuit. Analogously, the receiver is used to convert a reception signal, which is received by the hearing device by means of the resonant circuit and contains data that are to be received, into a digital signal, which is then processed further or can be processed further by the hearing device. In particular, the digital signal is in a baseband. The transmission signal and the reception signal are analogously at a reception frequency and transmission frequency, respectively, which are preferably identical.

In the case of the hearing device described here, the transceiver, more specifically the receiver thereof and/or the transmitter thereof and optionally also the resonant circuit, is able to be switched over between a first communication channel at a first frequency and a second communication channel at a second frequency. In other words: at least the transceiver is able to be switched over irrespective of whether the resonant circuit is able to be switched over. The first and second frequency are, in particular, carrier frequencies of the two communication channels and thus also define the transmission frequency and the reception frequency. One or both communication channels are preferably defined by a standard, in the latter case, in particular, by different standards.

As already indicated, the hearing device additionally comprises a control unit, which is preferably part of a digital chip of the hearing device. In particular, the control unit is connected to the communication frontend or a part thereof. The control unit is designed to switch over the transceiver between the first and the second communication channel for selective communication on one of the two communication channels, that is to say at one of the two frequencies. This advantageously enables the hearing device at least to receive and preferably also to transmit corresponding signals and thus data on two different communication channels by means of the same communication frontend and specifically by means of the same transceiver. However, in particular, simultaneous communication on both communication channels is not possible, but is excluded as a matter of principle.

The hearing device suitably additionally comprises an input transducer, a signal processing system and an output transducer. The input transducer is preferably a microphone; the output transducer is preferably an earpiece. In particular, the hearing device is assigned to an individual user and is used only by them. The hearing device is preferably used for treating a hearing-impaired user and for compensating for a hearing loss of the user. To this end, the input transducer produces an input signal, which is fed to the signal processing system. In particular, the signal processing system is part of a digital chip. The signal processing system modifies the input signal and thereby produces an output signal, which is thus a modified input signal. To compensate for the hearing loss, the input signal is amplified by a frequency-dependent amplification factor, for example in accordance with an audiogram of the user. The output signal is finally output to the user by means of the output transducer.

The first communication channel is preferably an NFC channel and the second communication channel is preferably an NFMI channel that is different therefrom. In this way, the transceiver is a combined NFC and NFMI transceiver. In principle, NFC can also be considered an NFMI technology. In the configuration described here with NFC channel on the one hand and NFMI channel that is different therefrom on the other hand, however, the term NFMI channel means an, in particular proprietary, NFMI technology that does not meet the NFC standard and differs therefrom primarily through the frequency used and optionally for example also through another modulation method or encoding method. The NFMI channel meant here accordingly does not meet the NFC standard, that is to say it is not simply an alternative NFC channel.

The first frequency is suitably 13.56 MHz and the second frequency is suitably 10.6 MHz. In this configuration, in particular, the first frequency is suitable for communication according to NFC standard and the second frequency is suitable for a different NFMI communication, that is different from said NFC standard, in particular according to a manufacturer's own or proprietary specification. However, one or both of the frequencies may also have other values.

In the following text, it is assumed, without restricting the generality, that the first communication channel is an NFC channel at a first frequency of 13.56 MHz and the second communication channel is an NFMI channel at a second frequency of 10.6 MHz.

The two communication channels are preferably, but not necessarily, used for communication between different devices, that is to say one communication channel is not merely a substitute for the other communication channel but expediently allows a different connection. In a particularly preferred configuration, the hearing device is a binaural hearing device, having two individual devices, which are used by the same user. In particular, during use as intended, one of the individual devices is worn by the user on the left side of the head and the other individual device is worn on the opposite, right side of the head. One of the two communication channels, preferably the NFMI channel, is designed for unidirectional or bidirectional communication between the two individual devices. The other of the two communication channels, preferably the NFC channel, is then specifically not used for communication between the individual devices but preferably for communication with an auxiliary device that is separate from the hearing device. In this case, communication with the auxiliary device proceeds either from both individual devices or only from one of the individual devices. In principle, it is also possible that one individual device is used as a relay for the other individual device during communication with the auxiliary device (with an appropriate time offset due to the double use of the transceiver, for example in a time-division multiplexing process). The auxiliary device is for example a smartphone, tablet, television, computer or the like. In other words: one of the two communication channels is preferably used exclusively for internal communication, that is to say for communication between the individual devices and therefore within the hearing device, and the other of the two communication channels is preferably used exclusively for external communication, that is to say for communication between the hearing device and an auxiliary device, that is to say another device that in particular is independent of the hearing device. "Independent" is understood to mean in particular that the auxiliary device is autonomous, that is to say it is also able to be used without the hearing device, has its own power supply and/or is mechanically decoupled from the hearing device.

In the present case, it has been identified that the communication frontend of a hearing device having an NFMI channel, in particular for communication between the two individual devices, can be used in a particularly simple manner for NFC communication as well, such that corresponding components do not have to be additionally integrated into the hearing device. Instead, the existing communication frontend is modified only slightly in order to also implement communication via an NFC channel, in particular in accordance with the NFC standard, in addition to the existing NFMI channel (which is not an NFC channel). Accordingly, an NFC function, for example Bluetooth coupling, charging device identification, localization, automatic configuration of the hearing device, identification of auxiliary devices with respect to the hearing device or vice versa, is then therefore specifically also accessible to the hearing device in addition to the general NFMI functionality (for example data exchange between the individual devices). In particular, only one individual communication frontend is thus used for communication on different communication channels.

In the present case, the essential adaptation is the described switchover ability of the transceiver (this is to be distinguished from an optional switchover ability of the separate resonant circuit). In other words: the transceiver is able to be adjusted such that a signal is or can be received and/or transmitted either at the first frequency or at the second frequency. To this end, the receiver and/or the transmitter are actuated accordingly and in this case in particular a reception frequency of the receiver and a transmission frequency of the transmitter are adjusted such that reception and/or transmission takes place selectively at the first or the second frequency (the control unit is accordingly designed to carry this out). The communication frontend suitably comprises an adjustable clock generator for specifying a clock (also: clock rate, clock frequency) for the transceiver for this purpose. The clock generator is connected to the receiver and/or to the transmitter in such a way that the clock is accordingly transferred to the receiver and/or to the transmitter. The clock then accordingly determines the reception frequency and/or the transmission frequency. The clock preferably even corresponds to a carrier frequency, that is to say to the reception frequency or the transmission frequency of the transmitter for communication on the respective communication channel. In other words: the clock generator directly specifies a carrier frequency for the transceiver; said carrier frequency (the clock) is now adjustable in order to switch over between different communication channels. The clock generator is also referred to as a local oscillator (LO) or "clock circuit". The control unit is then designed to adjust the clock of the clock generator, specifically to switch over the clock between two mutually different clocks, in order to switch over the transceiver. By switching over the clock generator, the first or the second communication channel is then used accordingly depending on the adjustment (at least unidirectionally, preferably bidirectionally).

In one suitable configuration, the clock is able to be switched over between the first frequency and the second frequency, that is to say in particular between two different carrier frequencies for the transceiver. The receiver thus uses the clock to convert the reception signal down from the carrier frequency thereof, in particular to the baseband. Conversely, the transmitter uses the clock in particular to convert the transmission signal up from the baseband to the carrier frequency. The details of the respective conversion are of no further significance in the present case, however.

As an alternative, also suitable is a configuration in which, for one of the communication channels, the frequency thereof (in particular carrier frequency) is not exactly met but in which the clock is able to be switched over between one of the two frequencies and a third frequency, which is so close to the other one of the two frequencies (in particular carrier frequencies) that a sideband with respect to said other frequency is within a carrier frequency band, in particular a reception frequency band, of the transceiver. This is based on the consideration that the data may be in a sideband with respect to the carrier frequency and it is therefore sufficient to receive only one corresponding frequency range on one side of the carrier frequency. This is also referred to as "single side band recovery" and is possible specifically in an NFC channel since the NFC standard defines transmission of data by a modulation, which in the corresponding signal leads to sidebands on the left and right of the carrier frequency. Accordingly, it is sufficient to adjust the clock and thus the reception frequency of the receiver such that it is on one side of the carrier frequency and the reception frequency band, which surrounds the reception frequency, then detects only one of the two sidebands. The reception frequency and the reception frequency band are dependent in particular on an auxiliary carrier frequency (for example 848 kHz in accordance with the NFC standard). The reception frequency then results as the sum or difference of the carrier frequency (that is to say the first or second frequency) and the auxiliary carrier frequency. The reception frequency band then extends for example above or below the carrier frequency (alternatively the carrier frequency is included) over the corresponding sideband and is arranged for example symmetrically (alternatively asymmetrically) to the reception frequency. A suitable bandwidth for the reception frequency band is for example 1.5 MHz to 2 MHz.

In particular, since both communication channels cannot be used at the same time, in one suitable configuration, one of the two communication channels is a standard channel (preferably the NFMI channel) and the other of the two communication channels is a demand channel (for example the NFC channel). The standard channel is adjusted and used as standard; in contrast, the demand channel is used only when needed, specifically when a signal is to be transmitted or received on said communication channel.

The communication frontend preferably comprises an output detector for measuring the output at the frequency of the demand channel and the control unit is designed to switch over the transceiver from the standard channel to the demand channel if the output detector measures an output above a specified threshold value at the frequency of the demand channel. The transceiver is then accordingly switched over from the standard channel to the demand channel if a signal is received on the demand channel. To this end, the output detector is adjusted specifically to the frequency of the demand channel (in the case of the NFC channel for example 13.56 MHz) and is connected to the resonant circuit in order to receive the reception signal therefrom and to measure the output therein at the frequency of the demand channel. If said output exceeds the specified threshold value, the transceiver is switched over to the demand channel.

The control unit is suitably designed to switch over the transceiver from the demand channel to the standard channel again after a specified time interval has elapsed (what is known as "timeout") or after communication via the demand channel has finished. In particular, the end of the communication is identified, in particular, by the control unit and for example indicated by appropriate data, which are transmitted at the end of the signal.

The resonant circuit does not necessarily have to be adapted but may deliver an accordingly damped signal at at least one of the two frequencies, using which communication is still possible. However, the resonant circuit preferably has an adjustable resonant frequency and the control unit is designed to adjust the frequency of the currently used communication channel as the resonant frequency of the resonant circuit. Analogously to switching over the transceiver depending on the frequency that is currently to be used, the resonant circuit is then also switched over accordingly in order to realize an optimum transmission and reception output at the frequency of the respective communication channel. This configuration is only optional but improves the communication, since otherwise one of the two communication channels would receive and/or transmit only with damping. The resonant frequency is expediently adjusted by virtue of the capacitance of the resonant circuit being adjusted. For this purpose, the capacitance of the resonant circuit is correspondingly adjustable.

In one preferred configuration, the resonant circuit is designed for load modulation by virtue of the resonant circuit having an adjustable resistor. The resistor is for example a controllable current source or an ohmic resistor. The load modulation is for example an ASK load modulation according to the NFC standard.

As an alternative or in addition, the transmitter comprises an H-bridge and the control unit is designed to actuate the H-bridge in such a way that the resonant circuit is short-circuited in order to implement load modulation. The H-bridge is therefore in principle also an adjustable resistor, at least for the purpose of load modulation. First of all, the comments already made above apply to the load modulation. One advantage with respect to the use of a resistor in the resonant circuit is in particular that said H-bridge is usually already present and therefore no additional components need to be added in order to implement load modulation specifically for NFC communication. The load modulation is accordingly implemented fully using components that are already present. Only the control unit is additionally programmed suitably accordingly. The H-bridge is in particular part of the preferably analog transmitter. Power is fed into the resonant circuit via the H-bridge, with said resonant circuit beginning to oscillate at the transmitting frequency. The resulting oscillation has a phase modulation impressed on it in the resonant circuit by way of actuation of the H-bridge with the correct phase.

A digital signal processing system is preferably realized using the already mentioned digital chip of the hearing device. In contrast, the communication frontend described above is preferably purely analog. The digital chip is used to process the received and/or transmitted data and to exchange said data with the communication frontend in the baseband. The communication frontend then carries out conversion up or down to the currently selected carrier frequency, which is specified by the clock generator, and performs the transmission or reception by means of the resonant circuit.

In summary, it is thus possible to extend the functional scope of a hearing device with respect to communication for the purpose of data exchange through few modifications of the existing architecture of said hearing device. In particular, proceeding from a hearing device having a communication frontend that is already designed for communication on an NFMI channel, which is not an NFC channel, it is possible to realize an additional option for communication via an NFC channel by means of the transceiver and resonant circuit thereof. To this end, one or more of the adaptations below (and already described in detail above) are expediently made:

- the clock generator for the transceiver is designed to be adjustable in order to switch over the conversion between a baseband on the one hand and the transmission/reception frequency on the other hand between two different frequencies,
- the resonant frequency of the resonant circuit is designed to be adjustable,
- an output detector is used to determine when there is a switchover between the two communication channels (at least in one direction),
- load modulation is implemented, for example directly in the resonant circuit or in the transceiver,
- a control unit is designed accordingly in order to carry out one or more of said adjustments.

Any lower layers (for example physical layers) and/or upper layers (for example protocol layers) of the NFC channel are implemented in particular in the digital chip and are then combined with algorithms that are likewise integrated therein for the NFMI channel in a single digital chip and in this case each implemented either as hardware or software.

The method is generally a method for operating a hearing device as described above. Within the method, the control unit switches over the transceiver between the first and the second communication channel as described for selective communication on one of the two communication channels.

Although the invention is illustrated and described herein as being embodied in a hearing device, such as a hearing device, and a method for operating same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
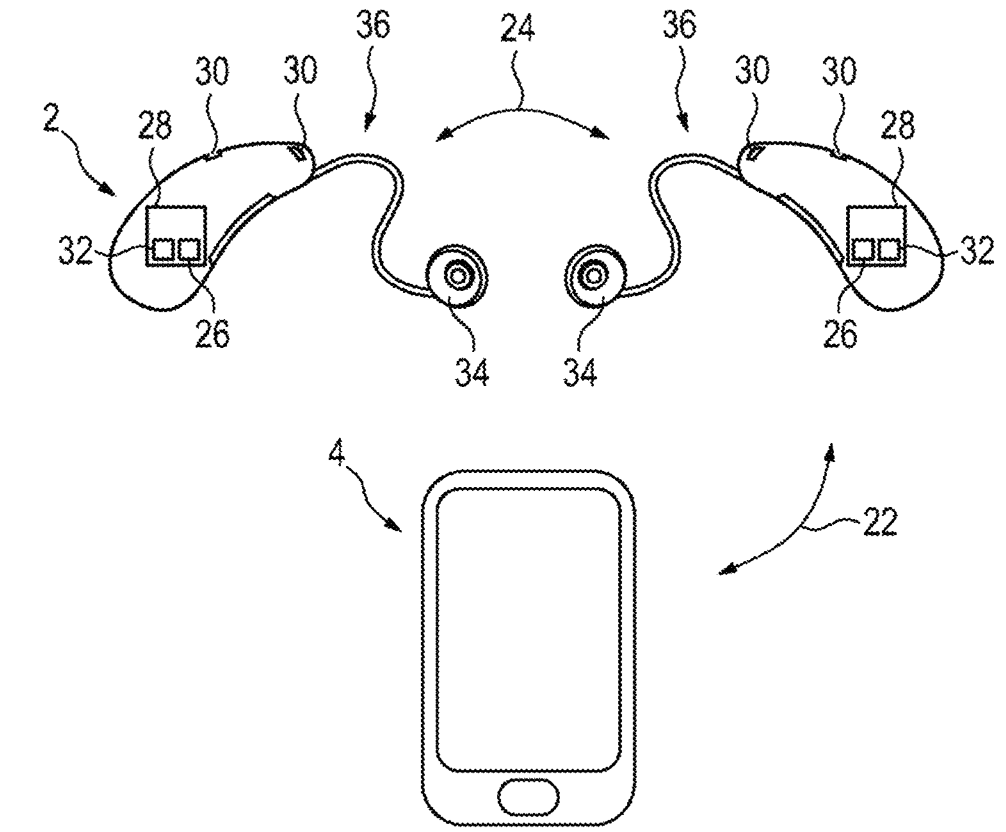
FIG. 1 is a diagrammatic view of a hearing device and an auxiliary device.
Figure 2:
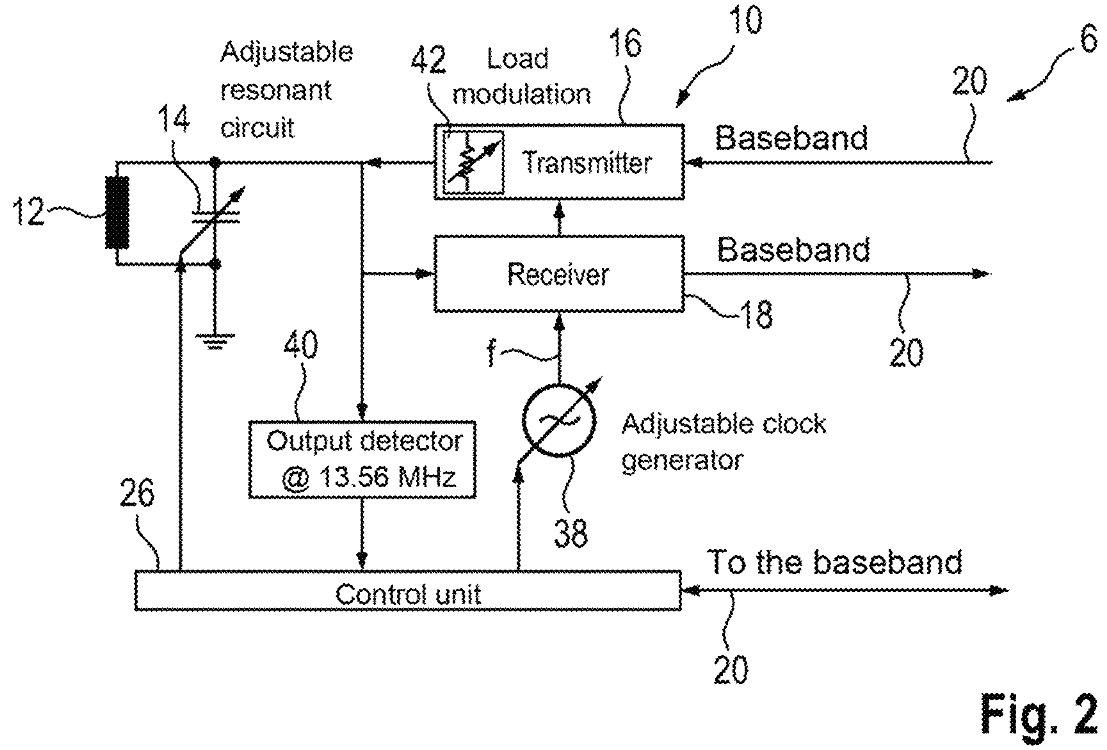
FIG. 2 is a schematic of a communication frontend and a control unit of the hearing device.

Referring now to the figures of the drawing in detail and first, in particular, to FIG. 1 thereof, there is shown an exemplary embodiment of a hearing device 2 according to the invention which, in the illustration may be a binaural hearing aid 2; an auxiliary device 4 is also shown (not true to scale). The hearing device 2 comprises a communication frontend 6, for which an exemplary embodiment is shown in FIG. 2. The communication frontend 6 comprises a resonant circuit 8 and a transceiver 10 for communication by means of electromagnetic induction. In this case, communication is understood to mean transmission and/or reception of electromagnetic signals containing data, in short a data exchange.

The resonant circuit 8 is connected to the transceiver 10 and is used to transmit and receive appropriate signals in the context of a communication. In FIG. 2, the resonant circuit 8 is an oscillating circuit, having an inductance 12 and a capacitance 14, which define a resonant frequency of the resonant circuit 8. During communication by means of electromagnetic induction, the inductance 12 is used as an antenna and the resonant frequency is a carrier frequency of the signals during communication.

The transceiver 10 comprises a transmitter 16 and a receiver 18. The transmitter 18 is used to convert a digital signal, which is produced by the hearing device 2 and contains data that are to be transmitted, into a transmission signal, which is then output by the resonant circuit 8. Analogously, the receiver 18 is used to convert a reception signal, which is received from the hearing device 2 by means of the resonant circuit 8 and contains data that are to be received, into a digital signal, which is then processed further or can be processed further by the hearing device 2. In this case, the digital signal is in a baseband 20. The transmission signal and the reception signal are analogously at a reception frequency and transmission frequency, respectively, which are identical in the present case.

In the hearing device 2 described here, the transceiver 10 and optionally also the resonant circuit 8 are able to be switched over between a first communication channel 22 at a first frequency f1 and a second communication channel 24 at a second frequency f2. In the present case, the first and second frequency f1, f2 are carrier frequencies of the two communication channels 22, 24 and thus also define the transmission frequency and the reception frequency.

The hearing device 2 also comprises a control unit 26, which is part of a digital chip 28 of the hearing device 2. In FIG. 2, the control unit 26 is part of the communication frontend 6; alternatively, it is simply connected thereto. The control unit 26 is designed to switch over the transceiver 10 between the first and the second communication channel 22, 24 for selective communication on one of the two communication channels 22, 24, that is to say at one of the two frequencies f1, f2. This enables the hearing device 2 at least to receive and preferably also to transmit corresponding signals and thus data on two different communication channels 22, 24 by means of the same communication frontend 6 and specifically by means of the same transceiver 10. However, simultaneous communication on both communication channels 22, 24 is not possible in the present case.

In the configuration shown here, the hearing device 2 additionally comprises an input transducer 30 (in this case: microphone), a signal processing system 32 and an output transducer 34 (this case: earpiece). The hearing device 2 is assigned to an individual user and is used only by them. The hearing device 2 is also used for treating a hearing-impaired user and for compensating for a hearing loss of the user. To this end, the input transducer 30 produces an input signal, which is fed to the signal processing system 32. In this case, the signal processing system 32 is part of the digital chip 28. The signal processing system 32 modifies the input signal and thereby produces an output signal. To compensate for the hearing loss, the input signal is amplified by a frequency-dependent amplification factor, for example in accordance with an audiogram of the user. The output signal is finally output to the user by means of the output transducer 34.

In the exemplary embodiment shown here, the first communication channel 22 is an NFC channel and the second communication channel 24 is an NFMI channel that is different therefrom. In this way, the transceiver 10 is a combined NFC and NFMI transceiver. In this case, the NFMI channel meant here does not meet the NFC standard, that is to say it is not simply an alternative NFC channel. In the present case, the first frequency f1 is then 13.56 MHz and the second frequency f2 is 10.6 MHz, such that the first frequency f1 is suitable for communication according to NFC standard and the second frequency f2 is suitable for different NFMI communication that is different therefrom, for example according to a manufacturer's own or proprietary specification. However, the frequencies f1, f2 may also have other values.

The two communication channels 22, 24 are used in the present case for communication between different devices, that is to say one communication channel 22 is not merely a substitute for the other communication channel 24 but allows a different connection. In the exemplary embodiment of FIG. 1, the hearing device 2 is a binaural hearing device, having two individual devices 36, which are used by the same user. During use as intended, one of the individual devices 36 is worn by the user on the left side of the head and the other individual device 36 is worn on the opposite, right side of the head. One of the two communication channels 22, 24, in this case the NFMI channel 24, is designed for unidirectional or bidirectional communication between the two individual devices 36. The other of the two communication channels 22, 24, in this case the NFC channel 22, is then specifically not used for communication between the individual devices 36 but for communication with the auxiliary device 4 that is separate from the hearing device 2. In this case, communication with the auxiliary device 4 proceeds either from both individual devices 36 or from only one of the individual devices 36. In FIG. 1, both individual devices 36 are provided with a digital chip 28 and a communication frontend 6 as shown in FIG. 2 and are accordingly designed to communicate with the respective auxiliary device 4 independently of one another via the communication channel 22. In principle, it is also conceivable that one individual device 36 is used as a relay for the other individual device 36 during communication with the auxiliary device 4. The auxiliary device 4 is for example a smartphone, tablet, television, computer or the like. Therefore, in FIG. 1, the communication channel 24 is used for internal communication, that is to say for communication between the individual devices 36, and the other communication channel 22 is used for external communication, that is to say for communication between the hearing device 2 and the independent auxiliary device 4.

The transceiver 10 is able to be adjusted such that a signal is or can be received and/or transmitted either at the first frequency f1 or at the second frequency f2. To this end, the receiver 18 and the transmitter 16 are actuated accordingly and in this case a reception frequency of the receiver 18 and a transmission frequency of the transmitter 16 are adjusted such that reception and/or transmission takes place selectively at the first or the second frequency f1, f2. In FIG. 2, the communication frontend 6 comprises an adjustable clock generator 38 for specifying a clock T (also: clock rate, clock frequency) for the transceiver 10 for this purpose. The clock generator 38 is connected to the receiver 18 and to the transmitter 16 in such a way that the clock f is accordingly transferred to the receiver and to the transmitter. The clock f determines the reception frequency and the transmission frequency. The control unit 26 is then designed to adjust the clock f of the clock generator 38, specifically to switch over the clock f between two mutually different clocks, in order to switch over the transceiver 10. By switching over the clock generator 38, the first or the second communication channel 22, 24 is then accordingly used depending on the adjustment.

Figure 3:
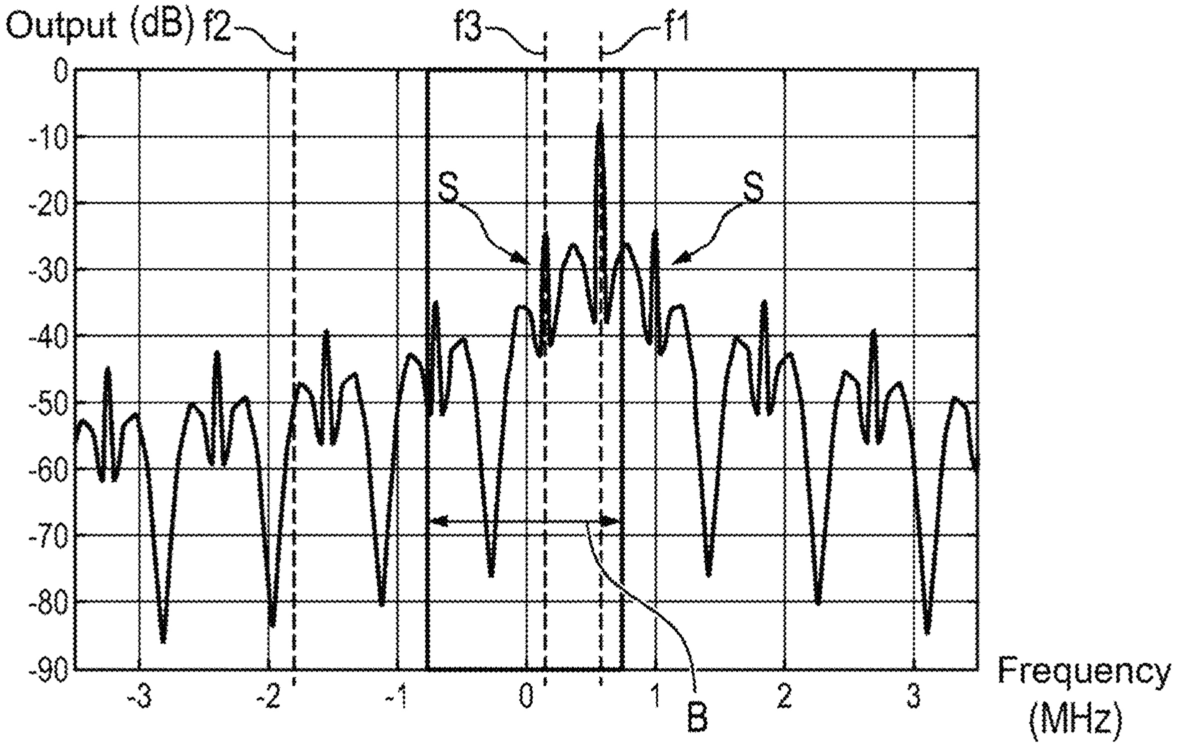
FIG. 3 shows a frequency spectrum of a reception signal.

In one possible configuration, the clock f is able to be switched over between the first frequency f1 and the second frequency f2. The receiver 18 thus uses the clock f to convert the reception signal down from the carrier frequency thereof to the baseband 20. Conversely, the transmitter 16 uses the clock f to convert the transmission signal up from the baseband 20 to the carrier frequency. As an alternative, also suitable is a configuration in which, for one of the communication channels 22, 24, the frequency f1, f2 thereof is not exactly met but in which the clock f is able to be switched over between one of the two frequencies f1, f2 and a third frequency f3, which is so close to the other one of the two frequencies f1, f2 that a sideband S with respect to said other frequency f3 is within a reception frequency band B of the transceiver 10. This is illustrated in FIG. 3, which shows an example of the frequency spectrum of a signal (or specifically the reception signal at the hearing device 2) during communication via the NFC channel 22. As can be seen, the data are in the sideband S with respect to the carrier frequency f1 and it is sufficient to receive only one corresponding frequency range on one side of the carrier frequency f1. During communication via the first communication channel 22, in the present case, the sidebands S are produced to the left and right of the carrier frequency f1. Accordingly, it is sufficient to adjust the clock f and thus the reception frequency of the receiver 18 to another frequency f3 such that it is on one side of the carrier frequency f1 and the reception frequency band B, which surrounds the reception frequency, then detects only one of the two sidebands S. The reception frequency and the reception frequency band B are dependent on an auxiliary carrier frequency (for example 848 kHz in accordance with the NFC standard). The reception frequency then results as the sum or difference of the carrier frequency (in this case the first frequency f1) and the auxiliary carrier frequency. FIG. 3 also shows an example of a possible second frequency f2.

Figure 4:
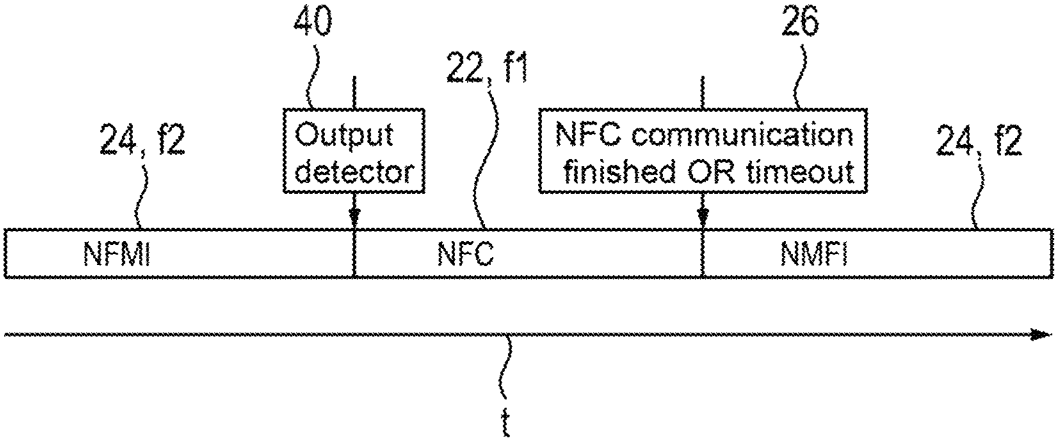
FIG. 4 is a timing diagram of a control process during the operation of the hearing device.

Since both communication channels 22, 24 cannot be used at the same time, in the configuration shown here, one of the two communication channels 22, 24 is a standard channel, in the present case the NFMI channel 24, and the other of the two communication channels 22, 24 is a demand channel, in the present case the NFC channel 22. The standard channel is adjusted and used as standard; in contrast, the demand channel is used only when needed, specifically when a signal is to be transmitted or received on said communication channel. This is illustrated by way of example in FIG. 4, which indicates, as a function of the time t, which communication channel 22, 24 is currently active and which frequency f1, f2 is currently accordingly adjusted (in FIG. 3, it is assumed that there is a switchover between the first and second frequency f1, f2 and that a frequency f3 is not used instead of one of the frequencies f1, f2). FIG. 4 thus also illustrates an exemplary embodiment of the method according to the invention in which the control unit 26 switches over the transceiver 10 between the first and the second communication channel 22, 24 for selective communication on one of said two communication channels 22, 24.

In the configuration shown here, the communication frontend 6 comprises an output detector 40 for measuring the output at the frequency of the demand channel (in this case the first frequency f1) and the control unit 26 is designed to switch over the transceiver 10 from the standard channel to the demand channel if the output detector 40 measures an output above a specified threshold value at the frequency of the demand channel. The transceiver 10 is then accordingly switched over from the standard channel to the demand channel if a signal is received on the demand channel. To this end, the output detector 40 is adjusted specifically to the frequency of the demand channel (in this case accordingly 13.56 MHz of the NFC channel 22) and is connected to the resonant circuit 8 in order to receive the reception signal therefrom and to measure the output therein at the frequency of the demand channel. If said output exceeds the specified threshold value, the transceiver 10 is switched over to the demand channel, as is also shown in FIG. 4.

As can also be seen in FIG. 4, the control unit 26 is also designed in the present case to switch over the transceiver 10 from the demand channel to the standard channel again after a specified time interval has elapsed (what is known as "timeout")—as shown here—or after communication via the demand channel has finished, which is identified by the control unit 26.

The resonant circuit 8 does not necessarily have to be adapted but may deliver an accordingly damped signal at at least one of the two frequencies f1, f2, using which communication is still possible. However, in the exemplary embodiment according to FIG. 2, the resonant circuit 8 preferably has an adjustable resonant frequency and the control unit 26 is designed to adjust the frequency f1, f2 of the currently used communication channel 22, 24 as the resonant frequency of the resonant circuit 8. Analogously to switching over the transceiver 10 depending on the frequency that is currently to be used, the resonant circuit 8 is then also switched over accordingly in order to realize an optimum transmission and reception output at the frequency f1, f2 of the respective communication channel 22, 24. In the configuration shown here, the resonant frequency is adjusted by virtue of the capacitance 14 being adjusted.

In the exemplary embodiment shown in FIG. 2, the resonant circuit 8 is designed for load modulation by virtue of the resonant circuit 8 having an adjustable resistor 42. The load modulation is for example an ASK load modulation according to the NFC standard. In an alternative exemplary embodiment, not shown here, the transmitter 16 comprises an H-bridge and the control unit 26 is designed to actuate said H-bridge in such a way that the oscillating circuit is short-circuited in order to implement load modulation.

In the present case, a digital signal processing system is realized using the already mentioned digital chip 28 of the hearing device 2. In contrast, the communication frontend 6 described by way of example here is purely analog. Other configurations are also possible, however. The digital chip 28 is used to process the received and/or transmitted data and to exchange said data with the communication frontend 6 in the baseband 20. The communication frontend 6 then carries out conversion up or down to the currently selected carrier frequency f1, f2, which is specified by the clock generator 38, and performs the transmission or reception by way of the resonant circuit 8.

The following is a summary list of reference numerals and the corresponding structure used in the above description of the invention:

2 Hearing device
4 Auxiliary device
6 Communication frontend
8 Resonant circuit
10 Transceiver
12 Inductance
14 Capacitance
16 Transmitter
18 Receiver
20 Baseband
22 First communication channel (NFC channel)
24 Second communication channel (NFMI channel)
26 Control unit
28 Digital chip
30 Input transducer
32 Signal processing system
34 Output transducer
36 Individual device
38 Clock generator
40 Output detector
42 Resistor
B Reception frequency band
f Clock
f1 First frequency (carrier frequency)

f2 Second frequency (carrier frequency)

f3 Third frequency

S Sideband t Time

The invention claimed is:

1. A hearing device, comprising:

a control unit;

a communication frontend having a resonant circuit and a transceiver for communication by way of electromagnetic induction;

said transceiver being configured to be switched over between a first communication channel at a first frequency and a second communication channel at a second frequency, one of said first or second communication channels being a standard channel and another of said first or second communication channels being a demand channel, and said communication frontend having an output detector for measuring an output at a frequency of the demand channel; and said control unit being configured to switch over said transceiver between said first and second communication channels for selective communication on one of said first and second communication channels, and said control unit being configured to switch over said transceiver from the standard channel to the demand channel when said output detector measures an output above a specified threshold value at the frequency of the demand channel.

2. The hearing device according to claim 1, wherein said first communication channel is a near-field communication channel and said second communication channel is a near-field magnetic induction channel different from said NFC channel.

3. The hearing device according to claim 1, wherein the first frequency is 13.56 MHz and the second frequency is 10.6 MHz.

4. The hearing device according to claim 1, the hearing device being a binaural hearing device with two individual devices, wherein one of said first or second communication channels is configured for communication between said two individual devices.

5. The hearing device according to claim 4, wherein said two individual devices are left and right hearing devices of a binaural hearing aid.

6. The hearing device according to claim 1, wherein said communication frontend comprises an adjustable clock generator for specifying a clock for said transceiver, and wherein said control unit is configured to adjust the clock of said clock generator in order to switch over said transceiver between said first and second communication channels.

7. The hearing device according to claim 6, wherein the clock is configured to be switched over between the first frequency and the second frequency.

8. The hearing device according to claim 6, wherein the clock is configured to be switched over between said first and second frequencies and a third frequency, wherein the third frequency so close to one of the first or second frequencies that a sideband with respect to the one of the first or second frequencies lies within a reception frequency band of said transceiver.

9. The hearing device according to claim 1, wherein said control unit is configured to switch over said transceiver from the demand channel back to the standard channel after a specified time interval has elapsed or after communication via the demand channel has finished.

10. The hearing device according to claim 1, wherein:

said resonant circuit has an adjustable resonant frequency; and said control unit is configured to adjust the frequency of a currently used communication channel as the resonant frequency of said resonant circuit.

11. The hearing device according to claim 1, wherein said resonant circuit has an adjustable resistor and said resonant circuit is configured for load modulation by adjustment of said adjustable resistor.

12. The hearing device according to claim 1, wherein:

said transceiver comprises a transmitter having an H-bridge; and said control unit is configured to actuate said H-bridge to short-circuit said resonant circuit in order to implement load modulation.

13. The hearing device according to claim 1, wherein the first frequency and the second frequency are carrier frequencies of said first and second communication channels.

14. A method for operating a hearing device, the method comprising:

providing the hearing device with a communication frontend, having a resonant circuit and a transceiver, for communication by way of electromagnetic induction;

wherein the transceiver is configured to be switched over between a first communication channel at a first frequency and a second communication channel at a second frequency, one of said first or second communication channels being a standard channel and another of said first or second communication channels being a demand channel, and said communication frontend having an output detector for measuring an output at a frequency of the demand channel;

providing a control unit and using the control unit to selectively switch over the transceiver between the first and second communication channels for selectively communicating on one of the first or second communication channels, and the control unit being configured to switch over said transceiver from the standard channel to the demand channel when said output detector measures an output above a specified threshold value at the frequency of the demand channel.

* * * * *